US006671681B1

(12) United States Patent
Emens et al.

(10) Patent No.: US 6,671,681 B1
(45) Date of Patent: Dec. 30, 2003

(54) SYSTEM AND TECHNIQUE FOR SUGGESTING ALTERNATE QUERY EXPRESSIONS BASED ON PRIOR USER SELECTIONS AND THEIR QUERY STRINGS

(75) Inventors: Michael L. Emens, San Jose, CA (US); Reiner Kraft, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 09/583,782

(22) Filed: May 31, 2000

(51) Int. Cl.[7] .............................................. G06F 17/30
(52) U.S. Cl. ...................... 707/5; 707/3; 707/6; 707/10
(58) Field of Search .......................... 707/1–7, 10, 102; 709/218, 220

(56) References Cited

U.S. PATENT DOCUMENTS

| 5,220,625 | A | * | 6/1993 | Hatakeyama et al. ........ 345/804 |
| 5,398,338 | A | | 3/1995 | Yoshida .......................... 707/7 |
| 5,584,024 | A | | 12/1996 | Shwartz .......................... 704/7 |
| 5,870,739 | A | | 2/1999 | Davis, III et al. ............... 707/4 |
| 5,873,080 | A | | 2/1999 | Coden et al. .................... 707/3 |
| 5,913,205 | A | * | 6/1999 | Jain et al. ..................... 382/305 |
| 6,006,225 | A | * | 12/1999 | Bowman et al. ................ 707/5 |
| 6,038,560 | A | * | 3/2000 | Wical ........................... 706/50 |
| 6,175,829 | B1 | * | 1/2001 | Li et al. ......................... 707/3 |
| 6,269,368 | B1 | * | 7/2001 | Diamond ........................ 707/6 |
| 6,321,228 | B1 | * | 11/2001 | Crandall et al. ............... 707/10 |
| 6,327,593 | B1 | * | 12/2001 | Goiffon ........................ 707/102 |
| 6,346,952 | B1 | * | 2/2002 | Shtivelman .................. 345/753 |
| 6,484,162 | B1 | * | 11/2002 | Edlund et al. .................. 707/3 |
| 6,516,312 | B1 | * | 2/2003 | Kraft et al. ..................... 707/3 |
| 6,523,037 | B1 | * | 2/2003 | Monahan et al. ............. 707/10 |
| 6,539,377 | B1 | * | 3/2003 | Culliss .......................... 707/5 |

OTHER PUBLICATIONS

Ravi Mukkamola, Rong Lin, *Improving Database Performance Through Query Standardization*, IEEE Proceedings—1989 Southeastcon, pp. 1321–1325.

* cited by examiner

*Primary Examiner*—Jean R. Homere
*Assistant Examiner*—Leslie Wong
(74) *Attorney, Agent, or Firm*—DeLio & Peterson LLC; Robert Curcio; Leonard T. Guzman

(57) ABSTRACT

An invention for monitoring user choices and selections on a search result web page and providing alternative query expressions to further narrow and enhance the user's search. Monitoring and recording user choices and selections is achieved by a query manager. Query strings are then standardized. The search is performed on an Internet search engine, and each search result item in the result output set is then associated with a list of alternative standardized queries by an alternate query matching manager. Each search result item in the result output set that is associated with the alternate queries is then flagged. The resulting flagged list of alternative queries is displayed to the user by a page presentation manager using a graphical user interface for subsequent user selection. Upon selection of the graphical user interface for alternate query expressions, an alternate query selection manager retrieves and displays each alternate query to the user.

21 Claims, 3 Drawing Sheets

SYSTEM AND TECHNIQUE FOR SUGGESTING ALTERNATE QUERY EXPRESSIONS BASED ON PRIOR USER SELECTIONS AND THEIR QUERY STRINGS

BACKGROUND OF THE INVENTION

1. Field of the Invention

This invention relates to Internet search engine technology, and specifically to the field of database searching. More specifically, the invention relates to an apparatus and method for suggesting alternate query expressions based on prior user selections.

2. Description of Related Art

The Internet comprises networks that are attached to one another via pathways that facilitate the exchange of information, data, and files. Being connected to the Internet means having access to these pathways that enables a user to perform searches on the World Wide Web (the "web"). The web is a globally connected network. The web contains "pages" that incorporate text, graphics, sound, animation, and other multimedia elements. In essence, each page is an interactive multimedia publication that can include videos and music as well as graphics and text.

The web operates on a client-server model. In this model, a client computer connects to a server computer on which information resides; the client depends on the server to deliver information. The services requested of the server may include searching for information and sending it back to the client, such as when a data base on the web is queried. Web client browser software is run on a personal computer connected to the web. That client contacts a web server and requests information or resources. The web server locates and then sends the information to the web browser, which displays the results. The client-server model enables a desktop personal computer to run the browser software to search the web, and yet still access host servers around the Internet to execute search and retrieval functions. This architecture enables the web to be conceived of as a limitless file storage medium and database, distributed among thousands of host computers, all accessible by any individual personal computer.

This invention relates to the situation where the personal computer based browser software requests the host server to perform a database query. The host computer executes the database search and sends back to the client the information requested in the form of a web page. As content of the Internet increases, this search information increases. Thus, it has become increasingly necessary to improve current search methodologies and create new search methodologies. The search methodologies are implemented by search engines or search tools. Search engines are essentially massive databases that cover wide swaths of the Internet. Search engines, however, do not present information in a hierarchical fashion. Rather, users must search through them as they would a database, by typing key words that describe the information sought after. Novice users may be overwhelmed by the abundance of search output results from broad based searches. Thus, with the increase in Internet content, there exists a need for applications and services capable of aiding and assisting the novice searcher with the use of more narrowly defined queries.

The prior art has addressed interactive database query systems, but none to the extent that a user's search query may be further enhanced by the synergy of combining the user's search with information from other users' search efforts. For example, in U.S. Pat. No. 5,584,024, issued to Shwartz on Dec. 10, 1996, entitled, "INTERACTIVE DATABASE QUERY SYSTEM AND METHOD FOR PROHIBITING THE SELECTION OF SEMANTICALLY INCORRECT QUERY PARAMETERS," a database query system is disclosed that includes a query assistant that permits the user to enter only queries that are both syntactically and semantically valid.

In U.S. Pat. No. 5,870,739, issued to Davis, III et al., on Feb. 9, 1999, entitled, "HYBRID QUERY APPARATUS AND METHOD," an arbitrary set of structured records is queried, where records can be evaluated for missing fields, repeating fields, or an unknown value arising from a missing field, division by zero, modulo by zero, or the like.

Importantly, query standardization has been implemented in the prior art for efficient execution of queries of databases. Although useful to query selection, standardization is only a component of enabling a user to visit suggested query expressions based on other user searches. In a published article by Mukkamula, et al., entitled "IMPROVING DATABASE PERFORMANCE THROUGH QUERY STANDARDIZATION," IEEE Proceedings, 1989 Southeastern, pp. 1321–1325, a scheme to efficiently store and retrieve execution plans for generalized queries is disclosed. This is conducted by standardizing the queries and using strategy databases. The technique for standardizing queries as disclosed by Mukkamula, et al., is incorporated herein by reference.

Bearing in mind the problems and deficiencies of the prior art, it is therefore an object of the present invention to provide an apparatus and method to enhance the usability and search accuracy of a search engine.

It is another object of the present invention to monitor and record user choices and selections made within a search result suite.

It is yet another object of the present invention to provide an apparatus and method to provide a more efficient query search based on the knowledge of other experienced searchers.

A further object of the present invention to provide an apparatus and method to improve a user's current query, and allow a user to benefit and learn from previous queries having the same search results. Users will be able to learn from these previous queries by being able to accurately articulate more powerful queries, and thus become more experienced with the art of successful searching.

SUMMARY OF THE INVENTION

The above and other objects and advantages, which will be apparent to one of skill in the art, are achieved in the present invention which is directed to, in a first aspect a method for providing an alternate for a current query associated with a current search result during a current search of an information repository by a current user, comprising: recording a prior query and an associated prior search result selected by a prior user during a prior search of the information repository; matching the current search result with the prior search result; and, providing the prior query to the current user as the alternate for the current query. The information repository may be comprised of Internet, Intranet, and wide area network configurations.

The matching of the current search result with the prior search result comprises: storing the prior search result in a database; comparing the current search result with the prior search result in the database; and, designating the current search result as a matched search result when the current search result is the same as the prior search result.

In a second aspect, the instant invention is directed to a method for providing alternate query expressions to a current user during a search of an information repository, comprising: recording queries and selections of the queries made by the current user; performing the search on one of the queries using the information repository, wherein the search yields search result output items; determining the alternate query expressions corresponding to the search result output items, wherein the alternate query expressions represent prior search result output items from a prior user that match the search result output items from the current user; and, displaying the search result output items with the alternate query expressions to the current user.

This method further comprises: designating those of the search result output items associated with the alternate query expressions from the prior user; and, displaying the alternate query expressions to the current user for each of the search result output items so designated. Additionally, this method may further comprise standardizing the queries and forwarding the standardized queries to a database, and also building and displaying a search result output page, and providing a graphical user interface on the output page for each of the search result output items so designated.

In a third aspect, the instant invention is directed to a method for providing alternate query strings from a prior user to a current user during a search of an information repository, comprising: monitoring and recording the current user selections of query strings made during the search; standardizing the current user query strings; storing the standardized current user query strings in a database, wherein the database includes the standardized current user query strings, the prior user alternate query strings, and search result output items from the alternate query strings; performing the search on one of the current user query strings and retrieving a plurality of search result output items from the search; matching the plurality of search result output items to the search result output items from the alternate query strings of the prior user; designating the plurality of search result output items that match the search result output items from the alternate query strings; displaying the plurality of search result output items; and, retrieving and displaying the alternate query strings for each of the plurality of search result output items so designated.

This may also include standardizing the current user query strings by converting a Boolean formula into a canonical representation while sorting keywords alphabetically.

In a fourth aspect, the instant invention is directed to a system for providing alternate query strings from a prior user to a current user during a search of an information repository, having connections to an interface device operated by the current user and the information repository, the system comprising: a query manager adapted to accept a query string from the current user; a database for storage and retrieval of alternate query strings from the prior user, the alternate query string results, the query string from the current user, and the query string results from the information repository; an alternate query matching manager adapted to match the query string results to the alternate query string results; a page presentation manager for displaying to the interface device the query string results, and for flagging the query string results that match the alternate query string results; and, an alternate query selection manager adapted to retrieve the alternate query strings and displaying the alternate query strings to the interface device.

In a fifth aspect, the instant invention is directed to a computer program product comprising: a computer readable program code for causing a computer to effect accepting a query string from a current user; a computer readable program code for causing a computer to effect standardizing the query string; a computer readable program code for causing a computer to effect storage and retrieval of alternate query strings and alternate query string results from a prior user, and the standardized query string and the standardized query string results from the current user; a computer readable program code for causing a computer to effect matching the standardized query string results to the alternate query string results; a computer readable program code for causing a computer to effect displaying to an interface device the standardized query string results, and for flagging those of the standardized query string results that match the alternate query string results; and, a computer readable program code for causing a computer to effect an alternate query selection manager capable of retrieving the alternate query strings and displaying the alternate query strings to the interface device.

In a sixth aspect, the instant invention is directed to a program storage device readable by a machine, tangibly embodying a program of instructions executable by the machine to perform method steps for providing alternate query strings to an Internet search user, the method steps comprising: recording a prior query and an associated prior search result selected by a prior user during a prior search of the information repository; matching the current search result with the prior search result; and, providing the prior query to the current user as the alternate for the current query.

This program storage device may further comprise embodying a program of instructions executable by the machine to perform method steps of: storing the prior search result in a database; comparing the current search result with the prior search result in the database; and, designating the current search result as a matched search result when the current search result is the same as the prior search result.

In a seventh aspect, the instant invention is directed to a program storage device readable by a machine, tangibly embodying a program of instructions executable by the machine to perform method steps for providing alternate query expressions to a current user during a search of an information repository, the method steps comprising: recording queries and selections of the queries made by the current user; performing the search on one of the queries using the information repository, wherein the search yields search result output items; determining the alternate query expressions corresponding to the search result output items, wherein the alternate query expressions represent prior search result output items from a prior user that match the search result output items from the current user; and, displaying the search result output items with the alternate query expressions to the current user.

In this aspect, the program storage device may further provide: designating those of the search result output items associated with the alternate query expressions from the prior user; and, displaying the alternate query expressions to the current user for each of the search result output items so designated.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

The instant invention monitors user choices and selections on a search result web page and associates those choices to an original standardized search string. With this information future users are empowered in several ways. For example, people who are searching for similar resources but using different search settings, can leverage from the knowledge of other experienced users. This requires the recording of user selections along with the query string.

Figure 1:
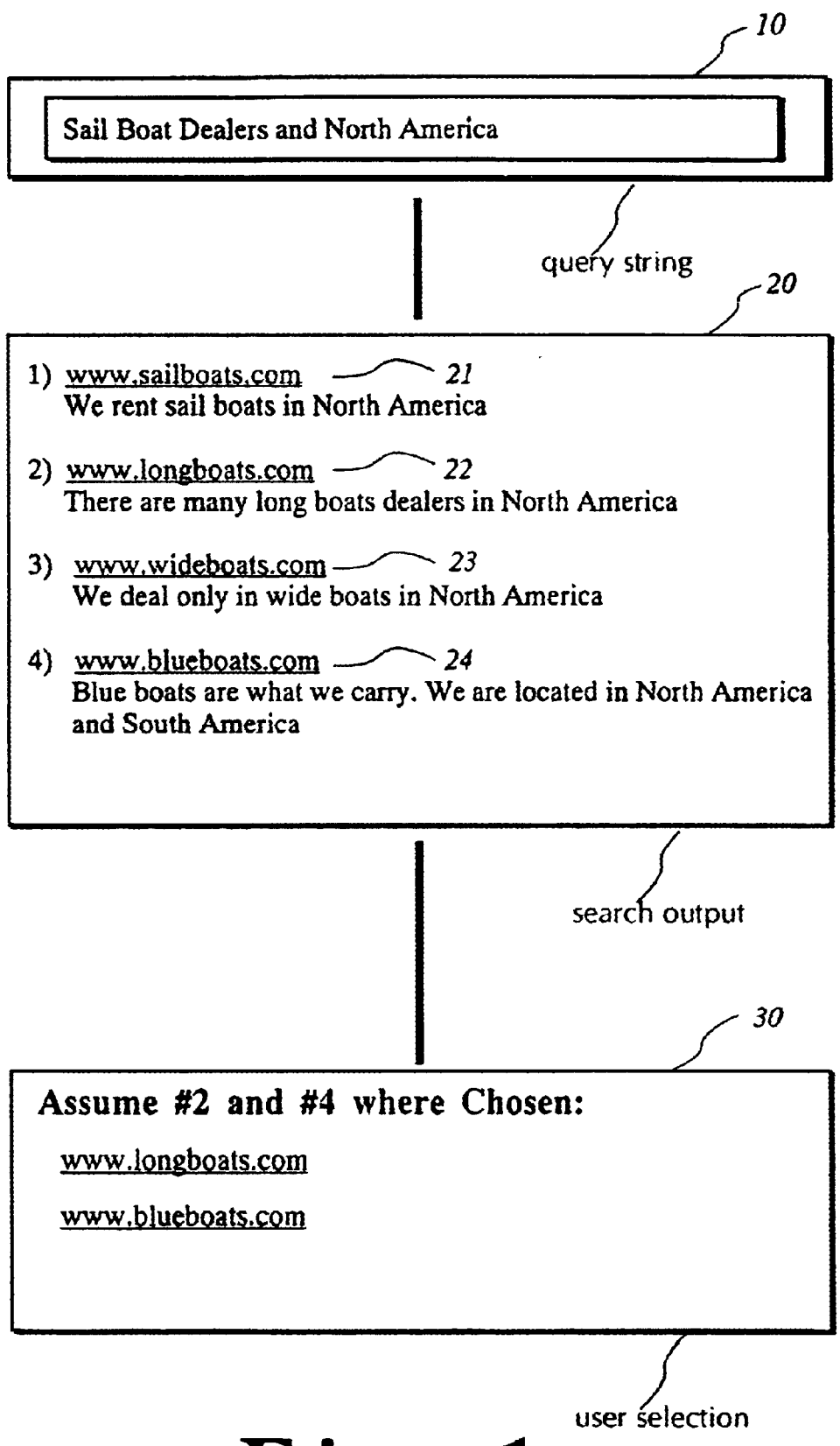
FIG. 1 is a graphical representation of an experienced user's search.
Figure 2:
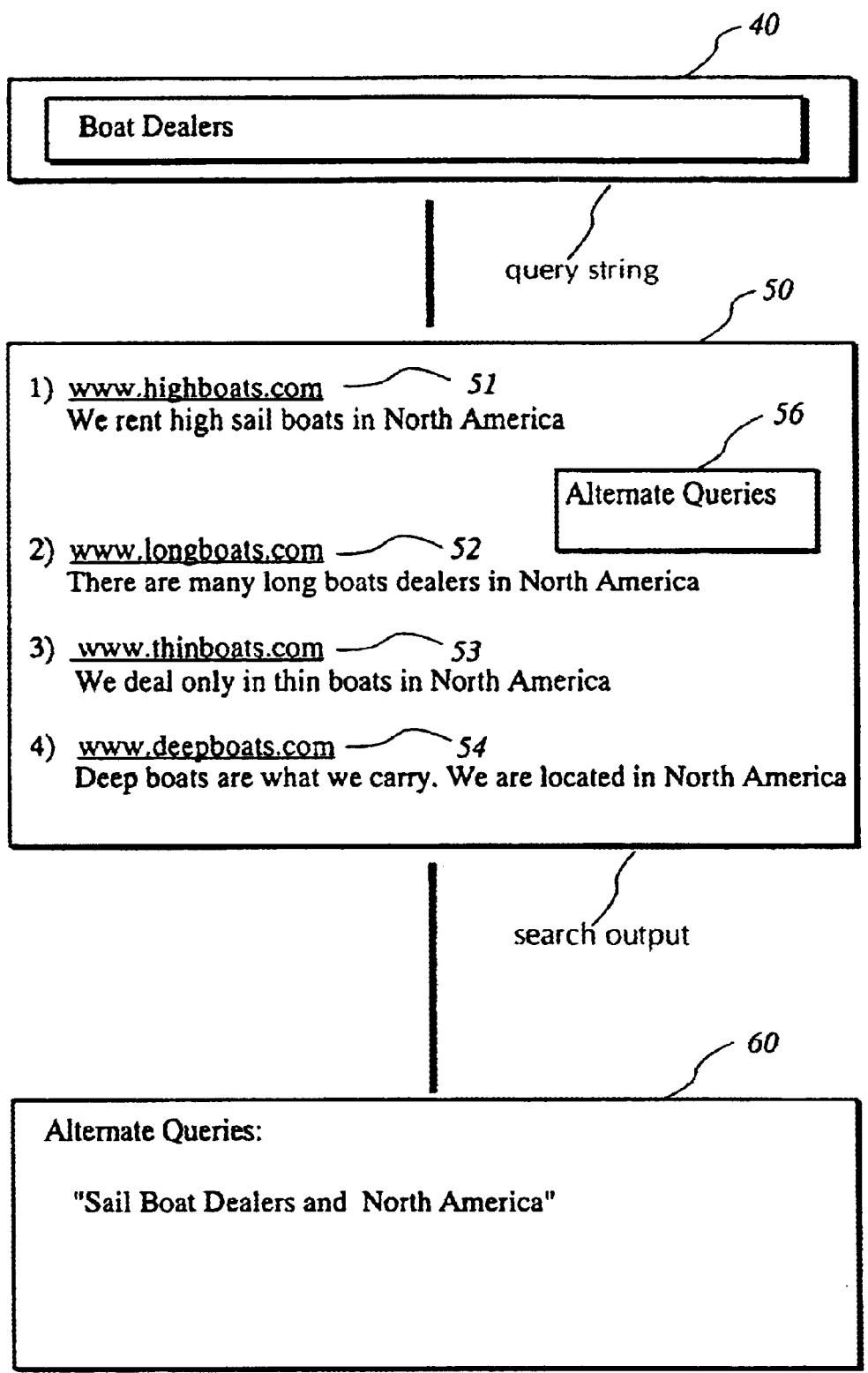
FIG. 2 is a graphical representation of an inexperienced user's search using the methodology of the instant invention.

FIGS. 1 and 2 illustrate an example of the methodology for the instant invention. For this example, User A is considered to be an experienced and skilled searcher of information repositories such as an Internet search engine, an Intranet search engine, or a wide area network, and the like, knowledgeable and capable of formulating complex query strings to find exactly the information for which she is searching. In FIG. 1, User A is searching for information on sail boat dealers in North America. The query string 10 entered is "Sail Boat Dealers and North America". The resultant page of the search output 20 will most likely involve over one hundred external uniform resource locators (URL's), which contain hypertext links to various boat dealers. Hypertext links are embedded into a web document using HTML (Hypertext Markup Language). A text link usually appears on the screen as an underlined word or phrase. Once displayed, a user may situate the cursor on this underlined text and select this link. This selection initiates or launches a request by the browser to retrieve a new web page or to position a new location on the same web page. As an example, search output 20 displays four such hypertext links 21, 22, 23, and 24.

With the search output 20 displayed, User A may begin to read through the abstracts provided, and will eventually select a result for closer examination. If User A finds an applicable search result or external resource requiring further examination, she may then select a hypertext link pointing to this external resource. Typically, the newly selected document will be downloaded into a viewing device, e.g., a web browser. User A is then able to further examine the whole document. When the review of the document is completed, User A may also select other hypertext links to resources on the result pages for further review, as applicable to her search requirements. For the illustrative example of FIG. 1, User A has selected "www.longboats.com" 22 and "www.blueboats.com" 24 as her choice 30 for further study. Importantly, the path of User A's query provides information regarding her method of finding the resultant hypertext links 22, 24, from which other inexperienced users would benefit.

Conversely, FIG. 2 depicts the search technique of User B, a novice search engine user. User B is not as knowledgeable concerning Internet searches, and consequently is more likely to have a broader search request which results in an inefficient and less informative output than User A's search output results. User B is also looking for sail boat dealers in North America. The query string entered, however, is broader than User A's query, namely "boat dealers" 40. The resultant page or search output 50 will be much larger than User A's query because User B's search request has not limited this search to boat dealers in North America. The resultant page of the search output 50 may contain hundreds or even thousands of external uniform resource locators (URL's) or more, each of which contain hypertext links to various boat dealers. Thus, User B is obligated to read a multitude of abstracts in an attempt to locate and assimilate his desired information.

However, had User B been knowledgeable enough to enter a more complex string like User A, he would have found a smaller number of search result items with a higher search accuracy. Essentially, by leveraging off of User A's experience, novice User B can benefit from the search expertise of a more advanced and skilled user. If User B finds "www.longboats.com" 52 to be a good match, he may further benefit from other skilled users by requesting alternate queries 56. These alternate queries are most likely more narrow than User B's initial search, and would provide a more refined search having "www.longboats.com" 52 as one of its search outputs. In this example, the alternate queries returned would be User A's query, "Sail Boat Dealers and North America" 60. Thus, User B has been able to quickly reuse User A's complex query string, and User A did not have to do anything different to her search suite to make this possible.

Figure 3:
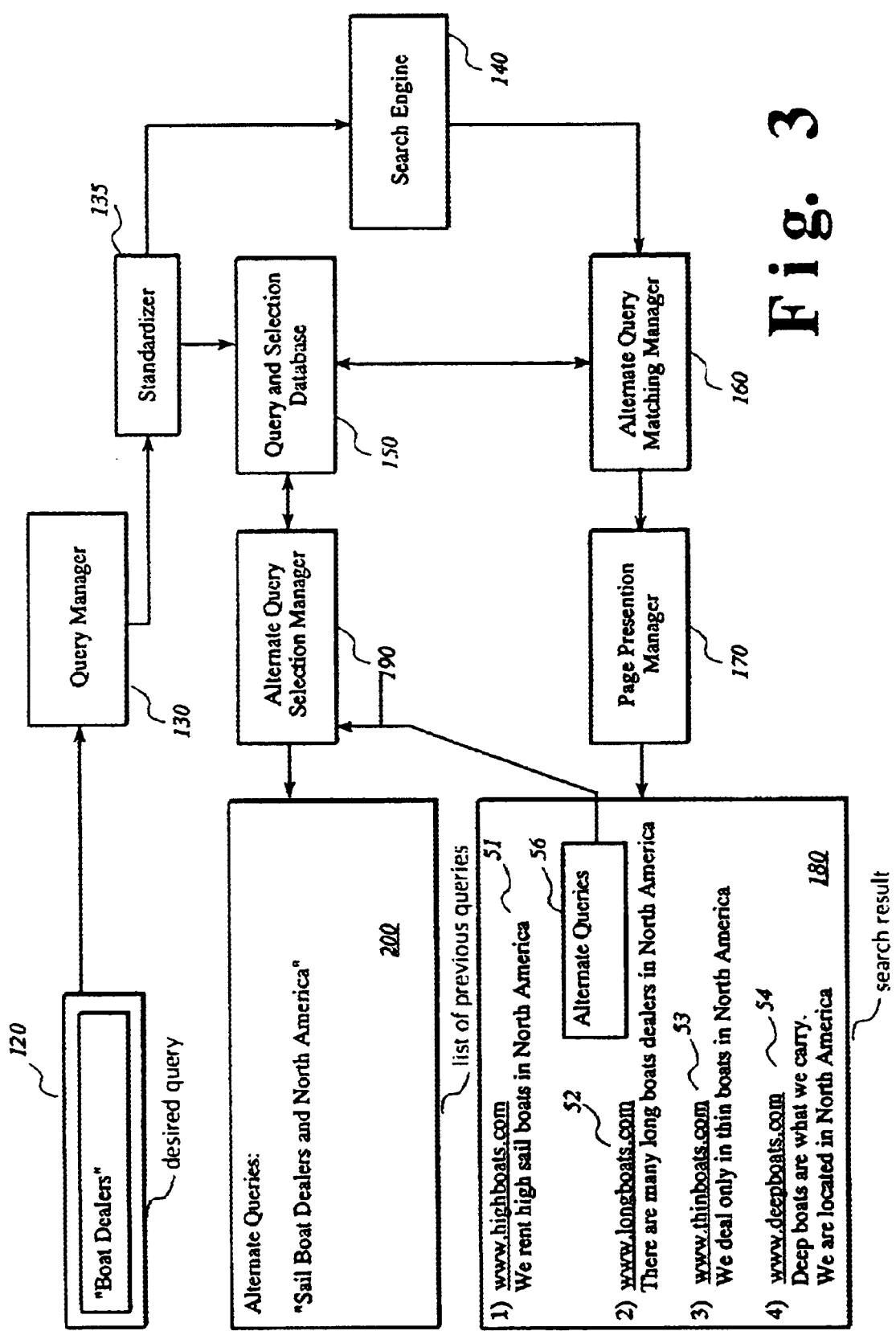
FIG. 3 is block diagram of the system architecture for performing the instant invention.

The methodology to express alternate queries based on prior user selections requires an architecture as depicted in FIG. 3. This involves recording user queries and the selections the users make. These selections, along with the query strings, are standardized 135 and stored in a Query and Selection Database 150, which is accessed by a search engine 140. A search result set 180 is analyzed. An alternate query designator 56 is assigned or each search result item that has an associate alternate query string. This process is determined by the Alternate Query Matching Manager 160. This designator 56 informs the user that alternate query strings are available which would also retrieve the particular hypertext link 52 so designated. The Query and Selection Database 150 is a depository of queries which the system may retrieve, yielding all prior query strings 200 for this particular search result item 52. Thus, if a user selects designator 56 for a particular search result item, a list of all available query strings for the search result item will be displayed. The query string is stored, along with the user selected search result items. For example, if a user issues a query that returns twenty (20) results in the search result item set, and then selects three search result items from this set, the following records would be recorded in the Query and Selection Database 150: a) the URL of search result no. 1; b) the URL of search result no. 2; c) the URL of search result no. 3; and, the standardized query string for these search result items. Other search result items and their associated standardized query strings are not stored since they were not selected by the user. Alternate query strings 200 are displayed for those user selected items.

The methodology generally comprises performing the following: a) monitor and record user choices and selections made on a search result set; b) standardize query strings to be able to determine similar queries, and thus avoid duplication; c) associate to each search result item in the result set a list of previously standardized queries; d) parse and extract search result items from the search result set; e) associate a list of previous queries to each search result item in the result set, if applicable; and, f) display the list of previous queries on demand using a graphical user interface (GUI).

First, a user inputs a desired query 120 which is directed to a Query Manager 130. When the first query is performed the Query Manager accepts the query string. Next, the query string is then standardized 135 using a standardized query expression methodology (SQE) such as the standardization delineated in the published article by Mukkamula, et al., entitled "IMPROVING DATABASE PERFORMANCE THROUGH QUERY STANDARDIZATION," IEEE Proceedings, 1989 Southeastern, or the like, incorporated herein by reference. Essentially, the standardizer or SQE function 135 will convert a Boolean formula into a canonical representation, while sorting keywords alphabetically. As a result, a query string like "dogs and cats" will be transformed into an alternative, such as "cats and dogs". This will allow the system to compare for similarity easily two search queries. The transformed standardized query then will be forwarded to the search engine 140 and to the Query and Selection Database 150. Each user selection is recorded along with the standardized query expression (SQE). If the SQE has already been recorded for that result then a counter for that SQE is incremented. The search engine performs the search as it usually does and produces a search resultant output set, which is returned to an Alternate Query Matching Manager 160.

Each result in the search resultant output set is received by the Alternate Query Matching Manager 160 and matched against all the other previous selections to that result found in the Query and Selection Database. This comparison occurs through the bidirectional communication link between the Alternate Query Matching Manager 160 and the Query and Selection Database 150. If a particular search output result is found to have been selected once before using a different query string, then that single search output result is flagged, which eventually will be displayed to the user indicating that there are alternate queries to be suggested. At this juncture, a list of previous queries is not attached to the search result page, as this list can be quite large. The list of alternate query expressions is retrieved on demand from the Alternate Query Selection Manager 190.

Next, the Page Presentation Manager 170 builds the search resultant output page. If a result is found to have an alternate query flag set, then that search result is graphically shown to the user as having an alternate query 56 available. The final result page then is returned to the user and displayed within the user's browser/viewer.

Lastly, the user may optionally select this alternate query GUI 56 to view alternate query string selections. If this graphical user interface is selected, then the Alternate Query Selection Manager 190 will accept this request and build an alternate query selection page for the user. Essentially, the Alternate Query Selection Manager 190 will perform a query to the Query and Selection Database 150, using the selected search result item as the search key. A list of previous or alternate queries 200 is then displayed to the user. These queries will only exist for those search result items that have been flagged by the user. The returned list of alternate search queries are graphically wrapped and returned to the user for review. Thus, the user is able to take advantage of any alternate query strings built by other users.

Subsequent users will perform searches using many different string expressions. Before the results for these searches are presented to these users, each result is checked to see if any prior users selected that result using a different SQE. If any previous users had selected that result using any other SQE then that result flagged. Once all the results have been filtered this way, the result page is presented to the user. Now the user is able to know more information about each result. If a result is visually flagged then the user knows this result was previously selected but with one or more different search strings.

The architecture of the instant invention may be integrated together with other search engine technologies, and the like, to enhance the search accuracy and any previous user experience for a search engine user.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention. Moreover, the present invention has been described in the context of an Internet application merely as a specific example, and is not meant to limit its applicability to Internet technology. Those skilled in the art will understand that the invention is broadly applicable to any method in which it is desirable to: record a prior query and an associated prior search result selected by a prior user during a prior search of an information repository; match a current search result with the prior search result; and, provide the prior query to the current user as an alternate for the current query.

Thus, having described the invention, what is claimed is:

1. A method for providing an alternate search for a current search query associated with a current search result during a current search of an information repository by a current user, comprising:

recording a prior search query and an associated prior search result selected by a prior user during a prior search of said information repository;

matching said current search result with said prior search result said matching including:

performing a search on one of said current user query strings and retrieving a plurality of search result output its from said search;

matching said plurality of search result output items to said search result output items from said alternate search query strings of said prior user;

designating said plurality of search result output items that match said search result output items from said alternate search query strings by flagging said search query string results that match said alternate search query string results; and, providing said prior search query to said current user as said alternate for said current query.

2. The method of claim 1 wherein said information repository comprises Internet, Intranet, and wide area network configurations.

3. The method of claim 1 wherein said matching said current search result with said prior search result comprises:

storing said prior search result in a database;

comparing said current search result with said prior search result in said database; and, designating said current search result as a matched search result when said current search result is the same as said prior search result.

4. A method for providing alternate search query expressions to a current user during a search of an information repository, comprising:

recording search queries and selections of said search queries made by said current user;

performing said search on one of said search queries using said information repository, wherein said search yields search result output items;

determining said alternate search query expressions corresponding to said search result output items, wherein said alternate search query expressions represent prior search result output items from a prior user that match said search result output items from said current user, said determination including performing a search on one of said current user search query strings and retrieving a plurality of search results output items from said search;

match said plurality of search result output items to said search result output items from said alternate search query strings of said prior user; and designating said plurality of search result output items that match said search result output items from said alternate search query strings by flagging said search query string results that match said alternate search query string results; and, displaying said search result output items with said alternate search query expressions to said current user.

5. The method of claim 4 further providing:

designating those of said search result output items associated with said alternate search query expressions from said prior user; and, displaying said alternate search query expressions to said current user for each of said search result output items so designated.

6. The method of claim 4 further comprising standardizing said queries and forwarding said standardized queries to a database.

7. The method of claim 5 further comprising building and displaying a search result output page, and providing a graphical user interface on said output page for each of said search result output items so designated.

8. The method of claim 4 further comprising gathering said alternate search query expressions having search result output items from said prior user that match said search result output items from said search by said current user, and generating and displaying an alternate search query selection page to said current user.

9. A method for providing alternate search query strings from a prior user to a current user during a search of an information repository, comprising:

monitoring and recording said current user search selections of query strings made during said search;

standardizing said current user search query strings;

storing said standardized current user search query strings in a database, wherein said database includes said standardized current user search query strings, said prior user alternate search query strings, and search result output items from said alternate search query strings;

performing said search on one of said current user search query strings and retrieving a plurality of search result output items from said search;

matching said plurality of search result output items to said search result output items from said alternate search query strings of said prior user;

designating said plurality of search result output items that match said search result output items from said alternate search query strings;

displaying said plurality of search result output items; and, retrieving and displaying said alternate search query strings for each of said plurality of search result output items so designated.

10. The method of claim 9, wherein standardizing said current user search query strings further includes converting a Boolean formula into a canonical representation while sorting keywords alphabetically.

11. The method of claim 9, further including building and displaying a search result output page, and providing a graphical user interface designator on said output page for each of said plurality of search result output items so designated.

12. A system for providing alternate search query strings from a prior user to a current user during a search of an information repository, having connections to an interface device operated by said current user and said information repository, said system comprising:

a query manager adapted to accept a search query string from said current user;

a database for storage and retrieval of alternate search query strings from said prior user, said alternate search query string results, said search query string from said current user, and said search query string results from said information repository;

an alternate query matching manager adapted to match said search query string results to said alternate search query string results;

a page presentation manager for displaying to said interface device said search query string results, and for flagging said search query string results that match said alternate search query string results; and, an alternate query selection manager adapted to retrieve said alternate search query strings and displaying said alternate search query strings to said interface device.

13. The system of claim 12 further comprising:

a standardizer for standardizing said search query string from said current user.

14. A computer program product comprising, a computer readable program code for causing a computer to effect accepting a search query string from a current user;

a computer readable program code for causing a computer to effect standardizing said search query string;

a computer readable program code for causing a computer to effect storage and retrieval of alternate search query strings and alternate search query string results from a prior user, and said standardized search query string and said standardized search query string results from said current user;

a computer readable program code for causing a computer to effect matching said standardized search query string results to said alternate search query string results;

a computer readable program code for causing a computer to effect displaying to an interface device said standardized search query string results, and for flagging those of said standardized search query string results that match said alternate search query string results; and, a computer readable program code for causing a computer to effect an alternate query selection manager capable of retrieving said alternate search query strings and displaying said alternate search query strings to said interface device.

15. A program storage device readable by a machine, tangibly embodying a program of instructions executable by the machine to perform method steps for providing alternate search query strings to an Internet search user, said method steps comprising:

recording a prior search query and an associated prior search result selected by a prior user during a prior search of said information repository;

matching said current search result with said prior search result, said matching including:

performing a search on one of said current user search query strings and retrieving a plurality of search result output items from said search;

matching said plurality of search result output items to said search result output items from said alternate query strings of said prior user;

designating said plurality of search result output items that match said search result output items from said alternate search query string by flagging said search query string results that match said alternate search query string results; and, providing said prior search query to said current user as said alternate for said current search query.

16. The program storage device of claim 15 further comprising embodying a program of instructions executable by the machine to perform method steps of:

storing said prior search result in a database;

comparing said current search result with said prior search result in said database; and, designating said current search result as a matched search result when said current search result is the same as said prior search result.

17. A program storage device readable by a machine, tangibly embodying a program of instructions executable by the machine to perform method steps for providing alternate search query expressions to a current user during a search of an information repository, said method steps comprising:

recording search queries and selections of said search queries made by said current user, performing said search on one of said search queries using said information repository, wherein said search yields search result output items;

determining said alternate search query expressions corresponding to said search result output items, wherein said alternate search query expressions represent prior search result output items from a prior user that match said search result output items from said current user, said determination including performing said search on one of said current user search query strings and retrieving a plurality of search results output items from said search;

matching said plurality of search result output items to said search result output items from said alternate search query strings of said prior user; and designating said plurality of search result output items that match said search result output items from said alternate search query strings by flagging said search query string results that match said alternate search query string results;

and, displaying said search result output items with said alternate search query expressions to said current user.

18. The program storage device of claim 17 further providing:

designating those of said search result output items associated with said alternate search query expressions from said prior user; and, displaying said alternate search query expressions to said current user for each of said search result output items so designated.

19. The program storage device of claim 17 further comprising standardizing said search queries and forwarding said standardized queries to a database.

20. The program storage device of claim 18 further comprising building and displaying a search result output page, and providing a graphical user interface on said output page for each of said search result output items so designated.

21. The program storage device of claim 17 further comprising gathering said alternate search query expressions having search result output items from said prior user that match said search result output items from said search by said current user, and generating and displaying an alternate search query selection page to said current user.

* * * * *